United States Patent
Moulder (12) United States Patent     (10) Patent No.: US 9,574,931 B2
Moulder     (45) Date of Patent: Feb. 21, 2017

(54) CHECKWEIGHER FOR CHECKING THE WEIGHT OF FILLED RECEPTACLES

(71) Applicant: MOLINS PLC, Milton Keynes, Bucks (GB)

(72) Inventor: Philip Moulder, Wiltshire (GB)

(73) Assignee: Molins PLC, Buckinghamshire (GB)

(*) Notice: Subject to any disclaimer, the term of this patent is extended or adjusted under 35 U.S.C. 154(b) by 209 days.

(21) Appl. No.: 14/363,279

(22) PCT Filed: Dec. 5, 2012

(86) PCT No.: PCT/GB2012/053016
§ 371 (c)(1),
(2) Date: Jun. 5, 2014

(87) PCT Pub. No.: WO2013/083970
PCT Pub. Date: Jun. 13, 2013

(65) Prior Publication Data
US 2014/0326519 A1    Nov. 6, 2014

(30) Foreign Application Priority Data

Dec. 6, 2011 (GB) .................................. 1120971.5
Aug. 3, 2012 (GB) .................................. 1213822.8

(51) Int. Cl.
*G01G 15/00* (2006.01)
*G01G 17/00* (2006.01)
(Continued)

(52) U.S. Cl.
CPC ............... *G01G 15/006* (2013.01); *B65B 1/46* (2013.01); *B65B 57/10* (2013.01); *G01G 15/00* (2013.01); *G01G 17/00* (2013.01)

(58) Field of Classification Search
CPC ...... G01G 15/00; G01G 15/006; G01G 17/00; B65B 1/46; B65B 57/10
See application file for complete search history.

(56) References Cited

U.S. PATENT DOCUMENTS 3,549,773 A    12/1970   Rossdorf et al.
3,808,772 A *   5/1974   Turtschan ............... B29C 51/20
                                                       425/387.1
(Continued)

FOREIGN PATENT DOCUMENTS

EP          1449767 A1    8/2004
EP          1014053 B1    9/2007
(Continued)

OTHER PUBLICATIONS

International Search Report issued in PCT/GB2012/053016, mailed Mar. 14, 2013, 2 pages.
(Continued)

*Primary Examiner* — Natalie Huls
(74) *Attorney, Agent, or Firm* — Fagre Baker Daniels LLP (57) ABSTRACT

A checkweigher (10) for measuring the weight of a pre-metered dose of medicament in a pharmaceutical blister (12) is provided. The checkweigher comprises a rotatable blister support element (14) for supporting a plurality of blisters (12), an evacuation assembly (16) for sequentially accessing and removing the contents of the plurality of blisters (12) as the blister support element rotates, a load sensor (18) for weighing the blister support element (14) and the plurality of blisters (12), drive means (20) for moving the blister support element (14) to and from the load sensor (18), and a controller (22) for controlling the drive means (20). The plurality of blisters (12) may be provided as single blister units or as part of a blister pack.

23 Claims, 7 Drawing Sheets

(51) Int. Cl.
*B65B 57/10* (2006.01)
*B65B 1/46* (2006.01)

(56) References Cited

U.S. PATENT DOCUMENTS

| | | | | |
|---|---|---|---|---|
| 4,490,963 | A * | 1/1985 | Knudsen | B65B 9/045 53/131.5 |
| 5,155,981 | A * | 10/1992 | Tordini | B65B 35/18 198/468.4 |
| 5,187,921 | A * | 2/1993 | Wilson | B26D 1/245 141/1 |
| 5,515,740 | A * | 5/1996 | Gamberini | A61J 3/074 177/119 |
| 6,770,823 | B2 * | 8/2004 | Buckner, III | B65B 1/46 141/83 |
| 2002/0134591 | A1 | 9/2002 | Fermier et al. | |
| 2003/0029771 | A1 * | 2/2003 | Whalen | G11B 5/102 206/711 |
| 2004/0055792 | A1 | 3/2004 | Reiser | |
| 2008/0219803 | A1 | 9/2008 | Runft et al. | |
| 2012/0321717 | A1 * | 12/2012 | Staniforth | A61K 31/485 424/490 |
| 2015/0268088 | A1 * | 9/2015 | Jezequel | B65B 1/46 177/1 |

FOREIGN PATENT DOCUMENTS

| | | |
|---|---|---|
| GB | 2269354 A | 2/1994 |
| WO | 2008139295 A2 | 11/2008 |

OTHER PUBLICATIONS

Search Report issued in GB Application No. 1120971.5, dated Aug. 10, 2012, 1 page.
Search Report issued in GB Application No. 1213822.8, dated Aug. 23, 2012, 2 pages.
International Preliminary Report on Patentability issued in PCT/GB2012/053016, mailed Jun. 10, 2014, 5 pages.

* cited by examiner

CHECKWEIGHER FOR CHECKING THE WEIGHT OF FILLED RECEPTACLES

The present invention relates to a checkweigher for determining the weight of powdered medicament in a pharmaceutical blister, and preferably though not exclusively, to a checkweigher used to determine the weight of a pre-metered dose of powdered medicament in an offline quality control test.

BACKGROUND OF THE INVENTION

Due to regulatory demands, it is necessary to check the weight of a blister once it has been filled with powdered medicament. The process of producing a dose of medicament must be tightly controlled such that each dose is accurate and consistent; otherwise, a patient's health is put at risk.

Accurate dosing of powdered medicament into blisters is difficult and can be exacerbated by the flow properties of the active pharmaceutical ingredient (API). A batch of filled blisters containing poorly controlled quantities of medicament can, depending on the API, be an expensive waste. Therefore, quickly establishing whether the filling line is performing as required is crucial.

Devices for weighing products following manufacture are known generally in the art as checkweighers. An in-line checkweigher requires each product to be weighed to pass over a balance facility whilst travelling along a transport device, such as a conveyor belt. When the products are spaced apart, current checkweighers are fast enough to weigh each product passing over the balance. However, the problem with the production of pharmaceutical blisters is the sheer quantity produced at high speed. Presently, it is impossible to accurately weigh individual blisters in-line without significantly reducing the line speed, which would seriously compromise production costs.

Furthermore, the in-line weighing of a sample of blisters in a batch has been found to be error prone since it requires the complete removal of all powder within the blister, which cannot be assured at higher speeds.

As such, a number of off-line weighing operations have been developed specifically for medicament filled blisters. One option is to determine individual blister fill weights by manually weighing each blister in a batch and subtracting the mean packaging weight. Alternatively, individual blister fill weights can be measured by evacuating the blister and subtracting the weight of the powder from the specific packaging weight for that blister.

However, in practice these processes have been found to be time consuming, awkward and lacking good reproducibility.

Moreover, in the case of blister strips, it is not possible to establish the individual blister fill weights because the blister strip packaging remains connected. The weight of the blister strip packaging far exceeds the weight of the powder contents, making a mean packaging weight determination impractical and unreliable.

In view of the problems outlined above, the present invention seeks to provide a fast and reliable offline process for accurately determining the weight of powdered medicament in a filled blister unit or blister strip.

SUMMARY OF THE INVENTION

According to the invention, there is provided a checkweigher for measuring the weight of a pre-metered dose of medicament in a blister, the checkweigher comprising a rotatable blister support element for supporting a plurality of blisters, an evacuation assembly for sequentially accessing and removing the contents of the plurality of blisters as the blister support element rotatably indexes, a load sensor for weighing the blister support element and the plurality of blisters, drive means for moving the blister support element to and from the load sensor, and a controller for controlling the drive means.

Preferable and/or optional features are outlined in the depending claims.

The advantage of the invention is that it automates the offline weighing of filled blisters and blister strips. Beneficially, this leads to a faster determination of whether or not the filling process is performing as it should be, enabling any corrective action to be taken swiftly.

Additionally, the checkweigher removes much of the operator intervention from the weighing operation, and in particular the medicament evacuation and weighing tasks. Consequently, the reproducibility of the weighing operation is improved.

Figure 1:
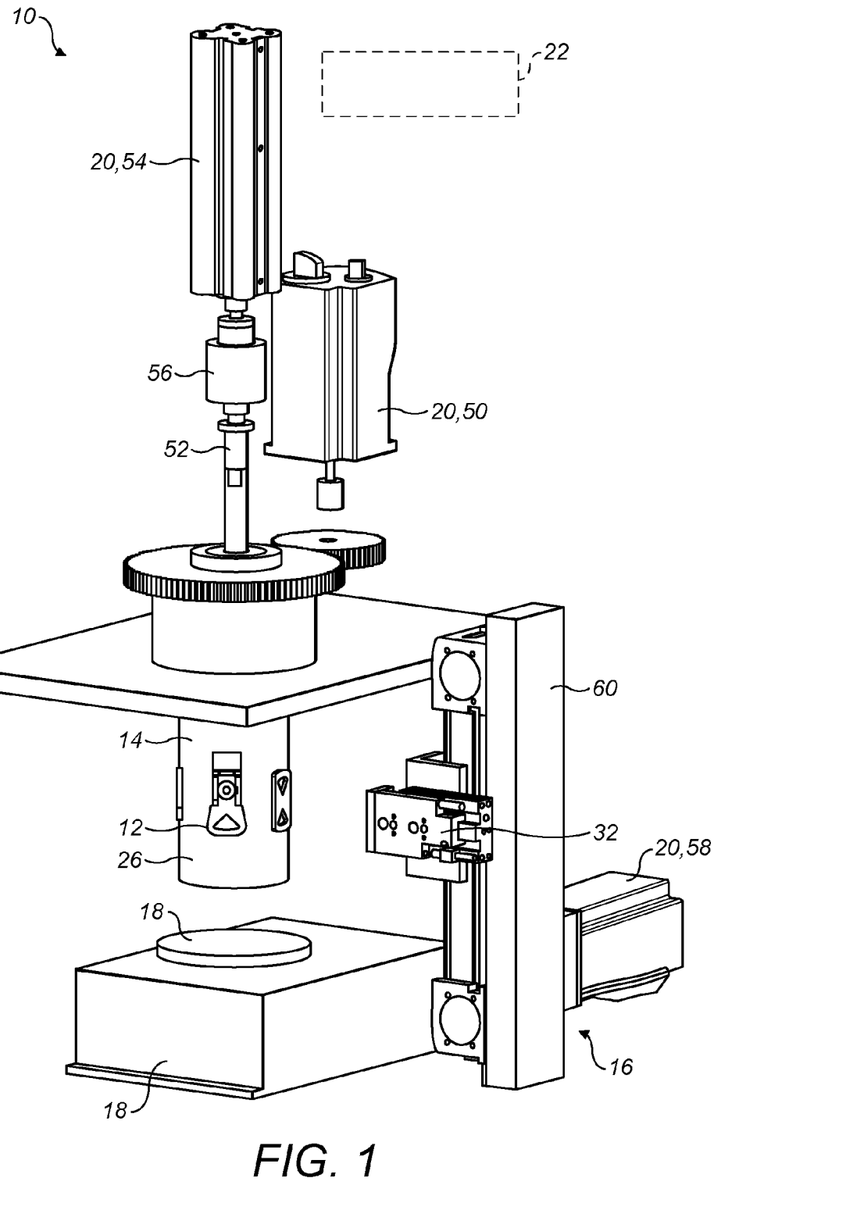
FIG. 1 shows a simplified schematic perspective view of a blister checkweigher according to the invention.

In view of the problems outlined above, the present application teaches an indexing checkweigher that uses a rotating spindle to transport blister strips and other powder receptacles. The rotating spindle does not rotate continuously but rotates with an indexing motion that allows a receptacle (or row of receptacles) to rest in a specific position. This allows the receptacles to be weighed whilst the spindle containing the receptacle (or row of receptacles) is static. Following this initial weighing, the receptacle is punctured with a piercing means and the powder within the receptacle is removed from the receptacle. Suitable means of powder removal include evacuation by connection to a low pressure evacuation line. Following evacuation, the spindle containing the receptacle (or row of receptacles) is weighed again by the checkweigher thereby allowing the user to make an accurate determination of the powder contained within the recently evacuated receptacle. In the case of blister strips, the spindle is indexed to bring a further blister into alignment with the piercing head and the process is repeated. An example of an intermittent motion checkweigher is illustrated in FIG. 1. The term "receptacle" shall mean a capsule, blister cartridge or blister or strip of connected blisters or any suitable reservoir for holding powder.

In another aspect of the invention a receptacle checkweigher is provided comprising a frame for holding a support surface, a moveable spindle comprising a plurality of receptacles, the spindle connected to said support surface, a weighing device for weighing the spindle, a spindle drive motor for producing rotation thereof and an evacuation means for removing powder from the receptacle, characterised in that the spindle has a plurality of recesses for holding powder filled receptacles is disclosed.

A further embodiment for ensuring alignment of the spindle arrangement employs an angled recess (not shown) within the roof of the spindle. Extending from the drive shaft is a spindle holder (not shown) of complementary peripheral dimensions which has upper dimensions complementary to the recess in the roof of the spindle. Upon engagement of the spindle with the spindle holder, the dimensions of the embossed section are such that they guide the spindle into predetermined positions but still allow the spindle to rest in a consistent manner for rotation and evacuation. The roof of such embossed sections may be chamfered and trilateral, quadrilateral, or any polygon shape. In further embodiments, frusto trilateral, frusto quadrilateral, or any frustopolygon may be employed. In a preferred embodiment a frusto-pyramidal embossed section with complementary dimensions in the spindle is employed for suitable orientation.

An alternative embodiment incorporates an optical sensor for alignment of a piercing head and piercing elements with the receptacle. The optical sensor may be located within the piercing head arrangement. Alternatively, the optical sensor may be located within the spindle arrangement.

Since receptacle evacuation is a destructive process, the data is used merely as a representation of fill weights obtained for the filling line for a particular batch and set of filling parameters. The convenience of the present teaching is that due to the speed, this assessment can be run in parallel with clinical and commercial scale manufacture. In other words, sample blisters or blister strips can be removed for assessment. Any blister strip batches with fill weights falling are outside the specified tolerance can be dealt with as appropriate.

In one embodiment, the checkweigher comprises a spindle containing individual receptacles around the circumference of spindle. The individual powder weight values for each receptacle in the strip can be determined by the checkweigher by sequentially weighing the spindle containing the receptacle strip after each evacuation procedure. In a further embodiment the spindle may contain multiple rows around the circumference of spindle. In a further embodiment the receptacles are capsules. In yet a further embodiment the receptacles contain capsules.

In one embodiment, the checkweigher comprises a spindle containing a strip of receptacles in series wrapped around the spindle in a ring. The individual powder weight values for each blister in the strip can be determined by the checkweigher by sequentially weighing the spindle containing the blister strip after each evacuation procedure.

In another embodiment, the checkweigher comprises a spindle containing a strip of receptacles in series wrapped around the spindle in a helix. The individual powder weight values for each receptacle in the strip can be determined by the checkweigher by sequentially weighing the spindle containing the receptacle strip after each evacuation procedure. In one embodiment, the receptacle strip is constructed around a central axis that rotates about an axis at a constant or continuously varying distance while moving parallel to said axis. In one embodiment the helix is a left-handed helix, in a further embodiment the helix is a right-handed helix. When viewed from above, with the line of sight along the spindle's axis, if a clockwise rotation provides the illusion of the helix moving away from the observer, then it is called a right-handed helix; if a clockwise rotation provides the illusion of the helix moving towards the observer then it is a left-handed helix.

In another embodiment, the checkweigher comprises a spindle containing a strip of receptacles in series attached to the spindle along the length of the spindle. The individual powder weight values for each receptacle in the strip can be determined by the checkweigher by sequentially weighing the spindle containing the receptacle strip after each evacuation procedure.

With each of the disclosures above, it is taught that multiple blisters, capsules or blisters strips or blister cartridges may be attached the spindle simultaneously thereby permitting multiple determinations.

With each of the disclosures above, it is taught that multiple spindles containing multiple blisters or blisters strips may be attached to each spindle thereby permitting multiple determinations.

A receptacle check weighing system includes a spindle for holding receptacle articles, a piercing means for piercing receptacle, an evacuation means connected to said piercing means for removing powder contained within said receptacle, a balance for weighing the spindle and receptacles.

In a further embodiment of the invention the checkweigher may incorporate additional monitoring devices for example metal detectors, moisture detectors, X-ray machines to enable other parameters of the pack to be monitored and acted upon as appropriate.

An intermittent motion checkweigher of the present invention is designed to accurately weigh powder in one or more receptacles whilst the spindle is static.

An intermittent motion checkweigher of the present teaching discloses a frame design that permits the drive motor to be mounted below a rotating spindle. In a further embodiment the intermittent motion checkweigher discloses a design that permits the drive motor to be mounted above a rotating spindle. In yet a further embodiment the intermittent motion checkweigher discloses a design that permits the drive motor to be suitably mounted so as to rotate a horizontal spindle.

Locating the drive motor beneath the spindle eliminates any loss of sight of the spindle as it is indexed. In such an embodiment the spindle will still need to be raised, indexed and then come to rest upon a balance for each evacuation determination to be accurately made. Locating the drive motor above the spindle allows the balance to rest upon a suitable supporting surface permitting more accurate evacuation determinations.

In a particular embodiment the spindle is elevated and lowered by the drive motor. This may involve elevation by direct contact of the spindle with the drive motor or indirect contact of the spindle with the drive motor via a secondary gearing mechanism as disclosed in FIG. 1. In the case of direct contract, the rotation of spindle via a supported screw and thread arrangement will enable elevation and lowering of the spindle.

In further embodiment a linear drive arrangement guides a piercer assembly which is able to elevate and lower along the guiding tracks of the liner drive arrangement. The piercer assembly may be driven by a separate mechanism such a motor. The motor may be a stepper motor, a servo motor, a hydraulic fluid pulse motor or gas cylinders. The drive motor can be programmed to index the product transport wheel. Alternatively the piercer assembly may be static.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE ILLUSTRATIVE EMBODIMENT

Figure 2:
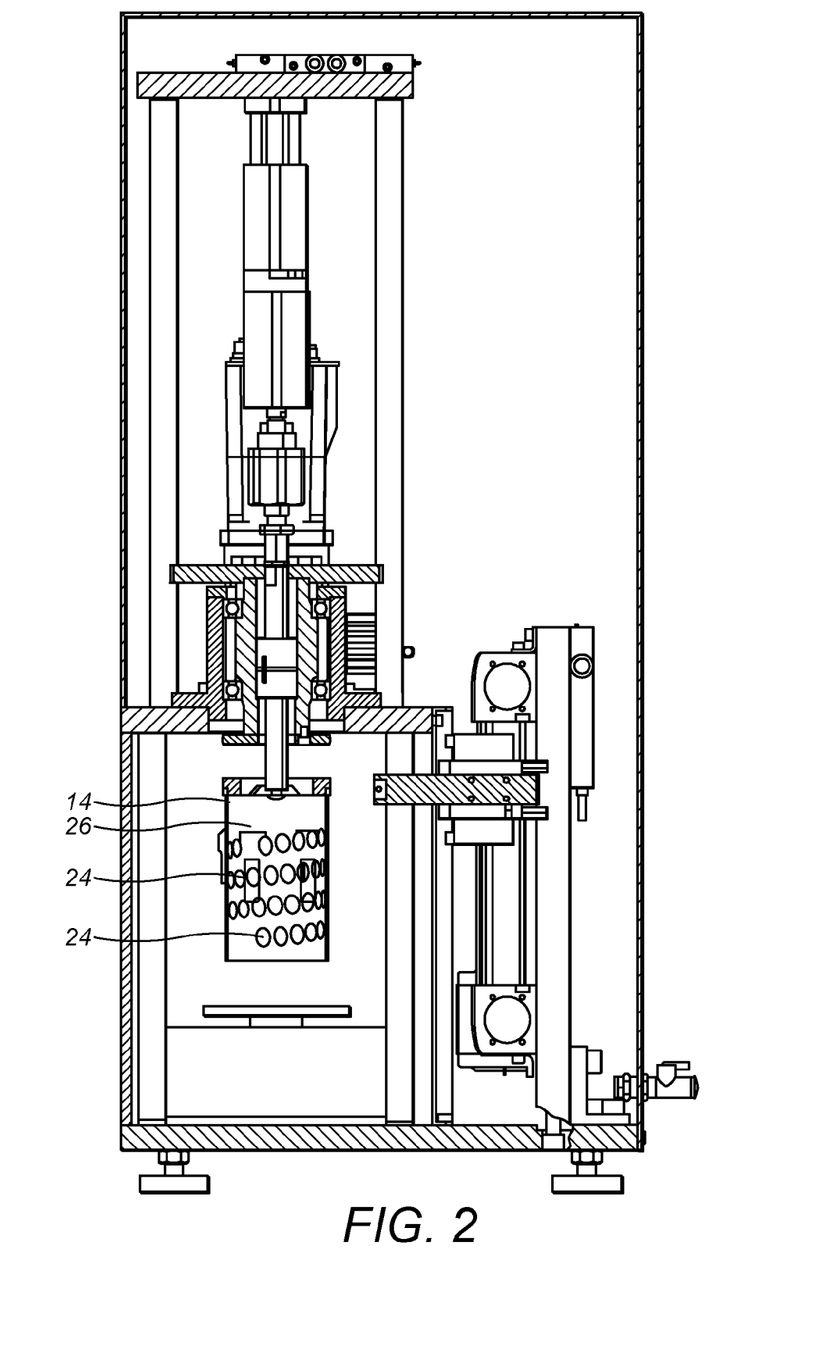
FIG. 2 shows a sectional view of the assembled blister checkweigher.

Referring firstly to FIGS. 1 and 2, a checkweigher in accordance with the invention is indicated generally at 10. The checkweigher 10 is used for measuring the weight of a pre-metered dose of medicament in a blister 12. This weighing operation is carried out offline, after the blister filling process, in order to verify the weight of the powdered medicament.

The checkweigher 10 comprises a blister support element 14 for supporting a plurality of blisters 12, an evacuation assembly 16 for sequentially accessing and emptying the plurality of blisters 12 while supported by the blister support element 14, a load sensor 18 for simultaneously weighing the blister support element 14 and the plurality of blisters 12 (both filled and empty), drive means 20 for moving the blister support element 14 to and from the load sensor 18, and a controller 22 (indicated in phantom) for controlling the drive means 20.

The blister support element 14 is a preferably cylindrical spindle adapted to support a plurality of blisters 12. However, the blister support element 14 may be a solid or hollow block having a square, a hexagonal or any other regular shaped cross-section. The blister support element 14 is rotatable about its longitudinal axis, preferably in a stepwise manner, as explained in more detail below.

Blisters 12 are supportable by the blister support element 14 around a peripheral extent thereof. In this exemplary embodiment, a plurality of recesses 24 is disposed in an external surface 26 of the spindle 14. Each recess 24 is configured to accept a bowl or well of a blister 12, with a tab of the blister 12 remaining flush against the external surface 26 of the spindle 14. In this context, the term "tab" is used to simply denote the conventional planar region extending from the blister bowl. Typically, each recess 24 and blister bowl is hemi-spherical, though other forms are envisaged, for example, oval or elliptical blister bowls and correspondingly shaped recesses. Each blister 12 is engageable with a recess 24 with a snug fit. In other words, a blister 12 may be held firmly by the recess 24, yet can still be removed therefrom.

The plurality of blisters 12 may be supplied individually or as a blister pack, such as a blister strip, i.e. a series of blisters provided in strip form.

The plurality of recesses 24 may be arranged circumferentially around the blister support element 14 so as to form a ring. In such an arrangement, the plurality of recesses 24 is preferably equi-angularly spaced. Alternatively, the plurality of recesses 24 may be arranged axially along the blister support element 14. In such an arrangement, the plurality of recesses 24 is preferably regularly spaced apart along the length of the blister support element 14. Alternatively, as indicated in FIG. 2, the plurality of recesses 24 may be arranged about the blister support element 14 in a helical manner to produce either a right handed or a left handed helix.

By winding blister strips onto a recessed blister support element 14, the diameter of the blister support element 14 can be reduced compared to a non-recessed blister support element. Consequently, the mass of the blister support element 14 can be reduced, with a beneficial reduction in requisite angular momentum, ultimately requiring the drive means 20 to draw less energy.

In this example, the evacuation assembly 16 comprises a piercing station 32 which is operable to piercably access the powdered contents of each blister 12. However, the evacuation assembly 16 may be adapted to peelably access the contents of each blister 12. In other words, lidding material of the blister 12 may be gradually separated from base material of the blister 12 at the evacuation assembly 16, in a conventional manner.

Figure 3:
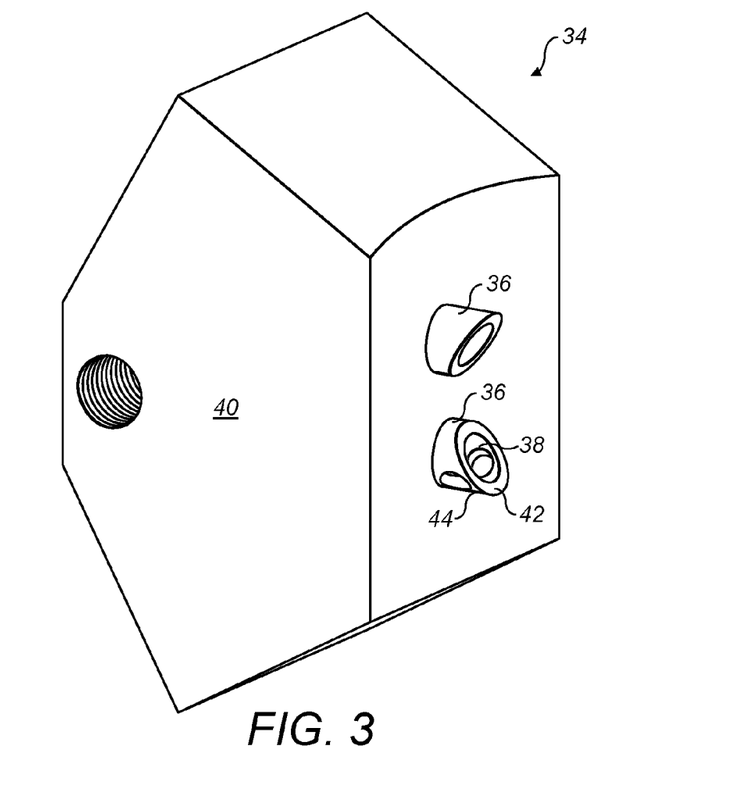
FIG. 3 show a schematic perspective view of a piercing head for an evacuation assembly of the blister checkweigher, and includes a piercing element for piercing a blister.

Referring now to FIG. 3, the piercing station 32 comprises a piercing head 34 having at least one piercing element 36 and at least one evacuation orifice 38. Each evacuation orifice 38 is a simple circular orifice.

Figure 4:
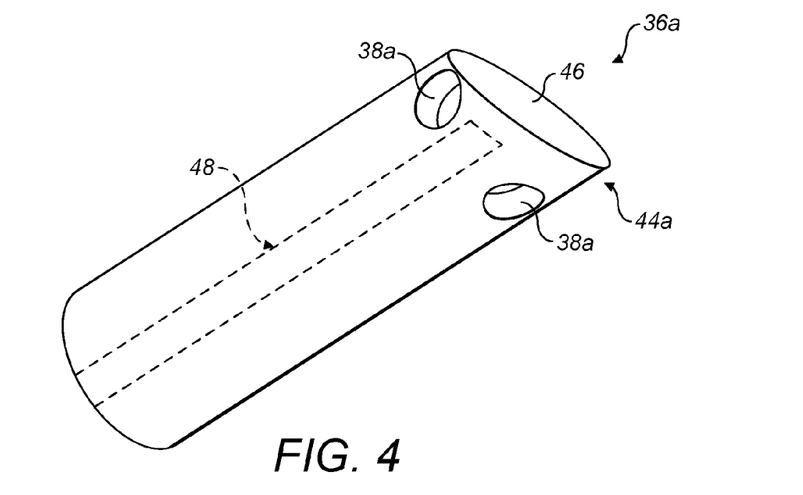
FIG. 4 shows a schematic perspective view of an alternative piercing element.

The or each piercing head 34 includes a block 40, which may be metal, from which extends the or each piercing element 36. The piercing head 34 is removable from the evacuation assembly 16 and may be substituted according to piercing requirements. The piercing element 36 is generally cylindrical, and is circular in lateral cross-section, though this need not necessarily be the case. FIGS. 3 and 4 illustrate two alternative piercing elements 36.

In FIG. 3, the piercing head 34 includes a pair of spaced apart piercing elements 36 and a pair of evacuation orifices 38. Each piercing element 36 is tubular and each evacuation orifice 38 is coaxial with an associated piercing element 36. The lower of the two piercing elements 36 in the drawing also includes a further two evacuation orifices, but these are optional and may be omitted. Each piercing element 36 has a pointed peripheral edge 42 or apex at its free end 44 for piercing the blister 12. Each pair of piercing elements 36 and evacuation orifices 38 is fluidly communicable with a vacuum source (not shown).

In FIG. 4, a planar piercing surface 46 closes a free end 44a of the alternative piercing element 36a. The piercing surface 46 is non-perpendicular to the longitudinal extent of the piercing element 36a such that the piercing element 36a is pointed for piercing the lidding material of a blister 12 held by the blister support element 14. The two visible evacuation orifices 38a extend radially part way through the piercing element 36a. A preferably central conduit 48 (indicated in phantom) extends longitudinally within the piercing element 36a and fluidly connects to the evacuation orifices 38a. The conduit 48 is fluidly connectable to a vacuum source (not shown). The conduit 48 and evacuation orifices 38a together define an air flowpath through which powder laden air may flow from a blister bowl to a collection chamber of the evacuation assembly 16.

The drive means 20 preferably comprises a stepper motor 50 drivably connected to a rotatable drive shaft 52. The blister support element 14 is connected to one end of the drive shaft 52. The motor 50 is operable to rotatably index the blister support element 14 about its longitudinal axis. However, any suitable drive means 20 may be used, for example, a servo motor, a hydraulic fluid pulse motor or gas cylinders.

Elevation (i.e. raising and lowering) of the blister support element 14 is governed by a second motor 54 and lift member 56. The lift member 56 is axially intermediate the second motor 54 and the blister support element 14. The second motor 54 and lift member 56 are configured to move the blister support element 14 towards and away from the load sensor 18 so that the blister support element 14 and the blisters 12 supported thereon can be weighed. Such movement may be limited to a plane parallel to the longitudinal extent of the blister support element 14 (i.e. up/down motion) or it may include movement in a plane parallel to the lateral extent of the blister support element 14 (i.e. left/right motion) too. To clarify, the drive means 20 may be adapted such that the blister support element 14 is moveable towards and away from the evacuation assembly 16.

Optional elevation of the evacuation assembly 16 is governed by a third motor 58. The third motor 58 is operable to move the evacuation assembly 16 along a linear drive 60. It should be noted that elevation may optionally be limited to just a portion of the evacuation assembly 16, for example, the piercing station 32. As such, the piercing head 34 may be moveable in a plane parallel to a longitudinal extent of the blister support element 14. Additionally or alternatively, the piercing head 34 may be moveable in a plane parallel to a lateral extent of the blister support element 14. To clarify, the evacuation assembly 16 may be adapted such that the piercing head 34 is moveable towards and away from the blister support element 14.

Alternatively, the evacuation assembly 16 may be configured to be stationary relative to the blister support element 14. In other words, it may be that the blister support element 14 is moveable relative to the evacuation assembly 16 and not vice versa, as mentioned above.

Preferably, one or both of the second and third motors 54, 58 are stepper motors.

In a preferred embodiment, the load sensor 18 is capable of providing a reading quickly. Consequently, the blister support element 14 may index rapidly, for example, the blister support element 14 may index at a rate of between 5 to 100 steps per minute, preferably 10 to 80 steps per minute, more preferably between 20 to 60 steps per minute. Faster and slower indexing rates are also possible, however, and the particular rate selected may be selected, for example, depending on the blister 12 format being weighed, and the diameter and/or weight of the blister support element 14.

The blister support element 14 preferably has a diameter of less than 300 mm. Preferably, the blister support element 14 has a diameter of less than 250 mm, more preferably less than 200 mm, even more preferably less than 150 mm, and yet more preferably less than 120 mm. Ideally, the diameter is less than 100 mm, more preferably less than 80 mm and more preferably less than 70 mm, less than 65 mm, less than 64 mm, less than 63 mm, less than 62 mm and less than 61 mm.

In a preferred embodiment, the blister support element 14 has a length of less than 900 mm, preferably less than 750 mm, preferably less than 600 mm, preferably less than 500 mm, preferably less than 120 mm, more preferably less than 109 mm, more preferably less than 108 mm, more preferably less than 107 mm preferably less than 100 mm, more preferably less than 80 mm and more preferably less than 60 mm and more preferably less than 30 mm.

In use, a plurality of filled blisters 12 is manually loaded onto the blister support element 14. The blisters 12 may be single blisters or blister strips. The controller 22 is energised. The blister support element 14 is then moved towards and onto the load sensor 18, where it subsequently and temporarily rests. The combined weight of the filled blisters 12 and the blister support element 14 is measured. Subsequently, the blister support element 14 is raised and the piercing station 32 then moved towards the blister support element 14. A sole blister 12 is pierced with one or more piercing elements 36, depending on the configuration of the piercing head 34, and then evacuated. The piercing station 32 is then withdrawn from the blister support element 14. The blister support element 14 is subsequently advanced onto the load sensor 18 and weighed again. The fill weight of that individual blister 12 can then be determined by subtracting the final weight value from the initial weight value, the difference being the individual fill weight of the blister.

The process steps above are then repeated as many times as required, with the blister support element 14 being indexed each time so as to present a different blister 12 (either a single blister unit or a blister 12 which is part of a blister strip) to the piercing station 32. The powdered medicament extracted from the blisters 12 is gathered in the collection chamber of the evacuation assembly 16 for subsequent analysis or disposal. Once all the blisters 12 have been sequentially evacuated and weighed as described above, the weighing operation is effectively complete.

The entire process is governed by the controller 22 which directs the operation and speed of the drive means 20, i.e. the first, second and third motors 50, 54, 58, taking into account the configuration of the blister support element 14 and the load pattern of the filled blisters 12 supported by the blister support element 14. The controller 22 is ideally pre-programmable, though strategic use of sensors, e.g. optical sensors, may facilitate an intelligent alternative approach.

Optionally, the checkweigher 10 may incorporate detectors or sampling devices, for example, metal detectors, moisture detectors, or X-ray machines, to enable other parameters of the blister or blister pack to be monitored.

The checkweigher 10 may further comprise electrostatic dissipation means for the dissipation of electrostatic charge from the blister support element. Suitable means include those known in the art, including metal strips, particularly, copper strips.

Although the blister support member 14 has been described as having a plurality of recesses 24 for receiving blister bowls, the blister support member 14 may be adapted to support the plurality of blisters 12 using one or more blister connectors. Such blister connectors are mounted to the external surface 26 of the blister support element 14. Each blister connector is adapted to engage with a single blister unit or a blister strip.

Nonetheless, recesses 24 for receiving blister bowls are easier and more economical to manufacture. With a recessed blister support element 14, each blister 12 presents a consistent surface to the piercing station 32, thereby ensuring greater accuracy for blister evacuation. Furthermore, a recessed blister support element 14 resists slippage of a blister strip relative thereto. Also, placing or winding single unit blisters or blister strips onto a continuous surface, as opposed to a recessed surface, could potentially compress and damage the blister bowl, thereby adversely affecting the blister 12 evacuation.

Although a single load sensor 18 has hitherto been mentioned, it is envisaged that two or more load sensors may be positioned below the blister support element 14 so as to facilitate the weighing step at more than one lateral position. Typically, the load sensor 18 is a balance including a load cell.

Although the blisters have been described as being typically supplied in strip form, it is envisaged that they may be supplied as part of a circular disc. As such, the circular disc is likely mountable on the blister support element in a similar manner to a blister strip.

Accordingly, there is provided a checkweigher that provides a fast and reliable offline process for accurately determining the weight of powdered medicament in a filled blister or blister strip.

In another embodiment FIG. 2 depicts the checkweigher comprising support housing 9 for holding the working components. The support housing 9 may be constructed of any suitable material and by any technique known in the art as being appropriate for such a purpose. Further components for levelling and maintaining stability and/or other mounting components may be associated with the support housing for facilitating proper installation and operation of the checkweigher, such as moveable legs. In particular, a granite surface provides a particularly stable surface for mounting the checkweigher. The granite surface may be separate or integrated with the checkweigher unit.

Figure 5:
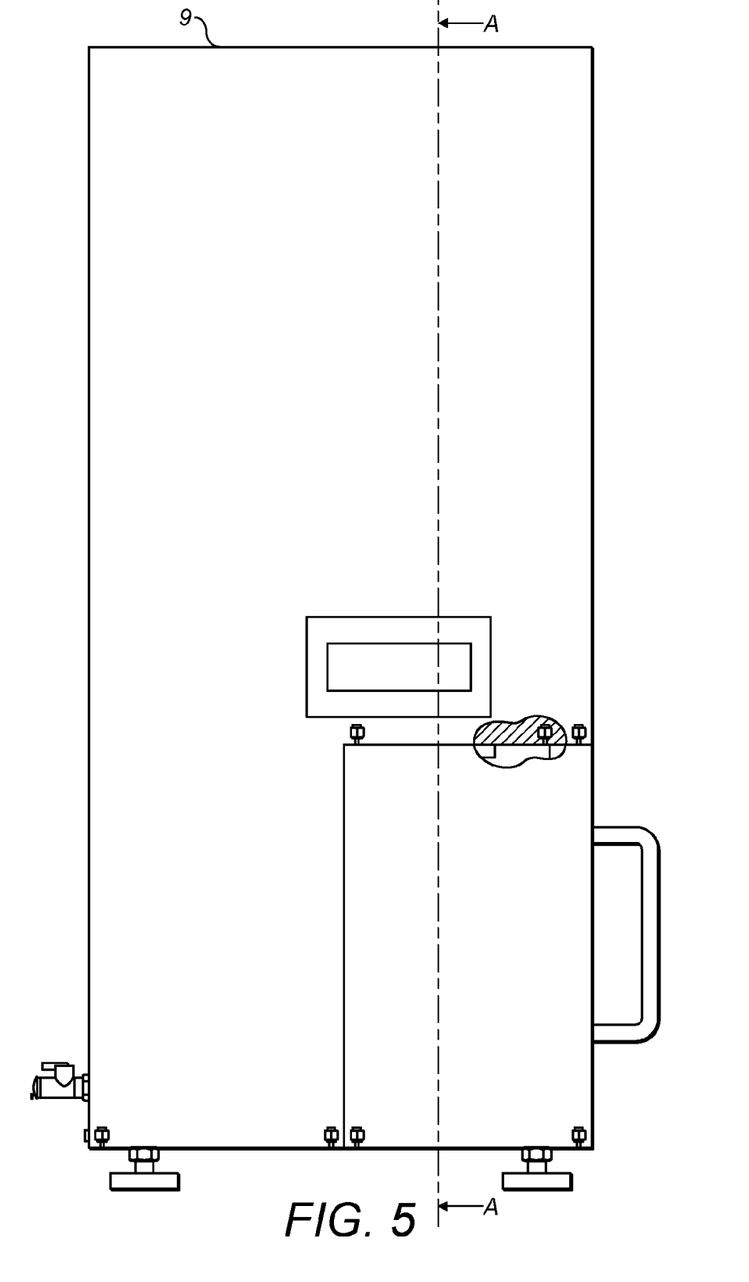
FIG. 5 shows a schematic drawing of the blister checkweigher in side view.
Figure 6:
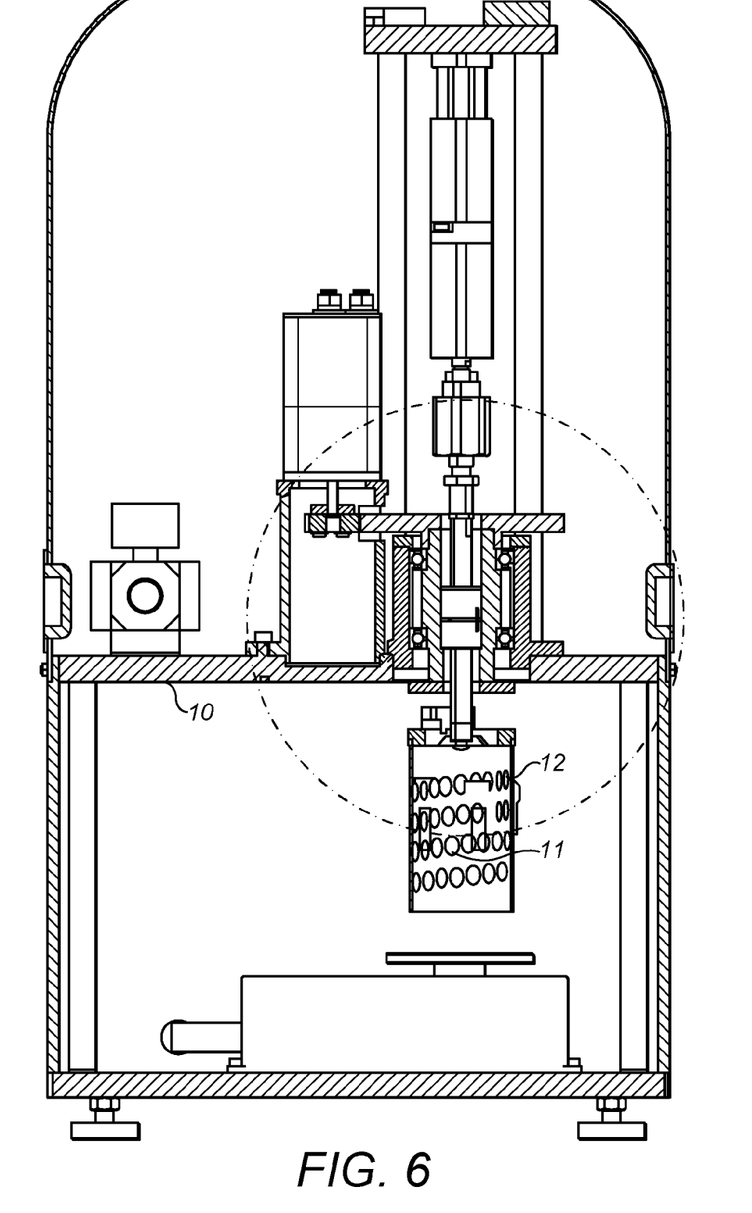
FIG. 6 shows a schematic drawing of the blister checkweigher in side view showing the spindle above the balance.
Figure 7:
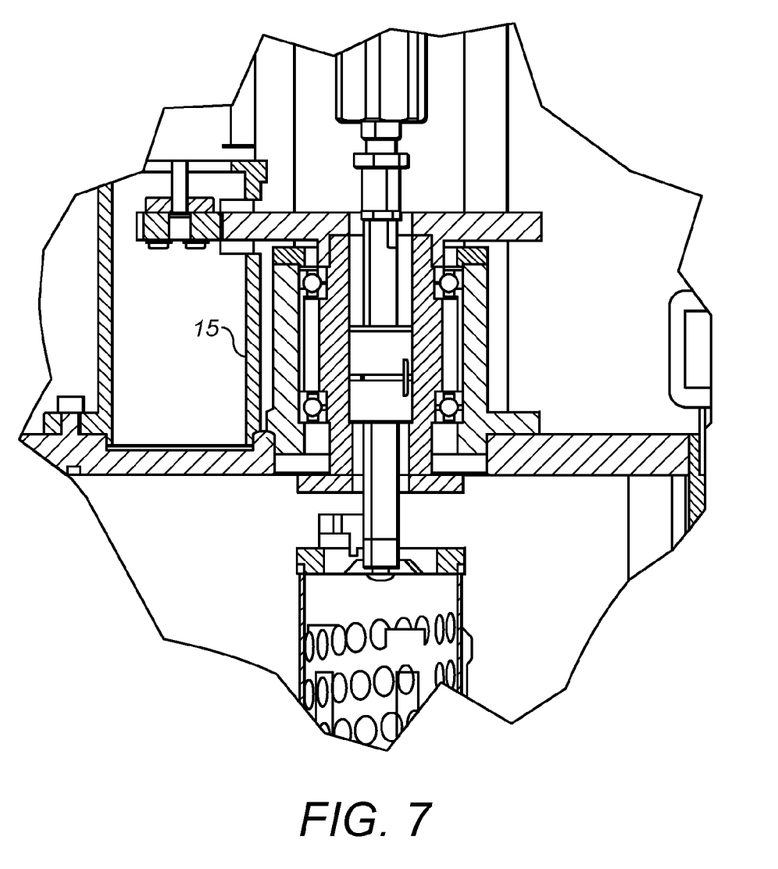
FIG. 7 shows a magnified view of the blister checkweigher housing arrangement.

The support housing 9 also supports a mid plate 10, which provides the surface upon which products to be weighed are supported as the spindle 14 indexes. As seen in FIGS. 5-7, the mid plate 10 supports the motor housing 15, which is described in more detail below.

The support housing may be constructed from a variety of materials, including without limitation, metals, plastics and composites. However, the selected material should exhibit sufficient strength and rigidity to support any products to be weighed by the checkweigher unit. The components of certain embodiments of the present invention may be manufactured from a low friction material or may include a low-friction coating on the product support surface thereof to facilitate product movement. The components of certain embodiments of the present invention should be anti-dusting components, that is, components which do not or resist forming particulates due to abrasion.

FIGS. 1 and 2 show spindle 14 which rotates above the balance 18. The spindle 14 is supported and rotated motor 20 connected to a drive gear shaft that, in this particular embodiment, is mounted above spindle 14. In this embodiment, the drive gear shaft is mounted to the midplate, but other mounting arrangements are possible. The drive motor 20 may be any motor known in the art that can be indexed as described below. Preferably, however, the drive motor 20 is an electric servo motor, which would be quite familiar to one of skill in the art. The drive motor 20 may be a stepper motor, a servo motor, a hydraulic fluid pulse motor or gas cylinders. The drive motor 20 can be programmed to index the product transport wheel.

The spindle 14 may have a smooth outer surface or it may contain recesses 24 for holding powder receptacles 12 or blister strips in place. The spindle recesses of a checkweigher extend inward from the circumferential edge of the spindle. The number of spindle recesses may vary depending on the size of the products to be weighed and the diameter of the spindle. The advantage of a recessed spindle 14 is that when the receptacle is placed within the recess, the receptacle presents a consistent surface to the piecing member thereby ensuring greater accuracy for receptacle evacuation. A further advantage of a recessed spindle 14 is that it resists slippage of a blister strip wrapped around the spindle. The former construction obviously reduces the cost of spindle 14 and allows for multiple blister formats to be used.

As with the support housing, the spindle 14 may be manufactured from a variety of materials, as long as the selected material exhibits sufficient strength and rigidity, and meet any particular requirements associated with the environment in which the checkweigher is operated. For example, certain applications, such as those in the pharmaceutical and food industries, may require the use of particular materials to facilitate cleaning and minimize contamination. Those materials that minimise dust particles are particularly preferred.

The spindle recesses 24 of the checkweigher of the present invention may be directed radially inward towards a centre point of the spindle 14. Alternatively, spindle 14 may be provided with a plurality of offset spindle recesses 24 The term "offset" as used herein, is intended to mean that the spindle recesses 24 do not extend radially converging on the axis the spindle 14. Rather, each spindle recess is orientated to receive a blister strip 12 when wrapped around the spindle 14 in a helical manner. In a further embodiment the spindle recesses 24 are orientated to receive a blister strip 12 along the length of the spindle 14 parallel with the axis of the spindle.

The use of a spindle 14 with offset spindle recesses provides a number of advantages. For example, and without limitation, the use of spindle recesses allows for longer blister strips to be used. The space between helixes permits the placement of additional interwoven blister strips which allows for the retention of a greater number of blister strips per spindle 14. An additional advantage of using a spindle with a recess is winding blisters onto a smooth surface could potentially compress and damage the blister bowl thereby adversely affecting the blister evacuation. A further advantage of a spindle comprising spindle recesses 24 is that it enables the use of a spindle of smaller diameter than would be possible using a wheel of like diameter without spindle recesses. Consequently, use of a spindle 14 of reduced diameter, results in a spindle 14 of less weight and may permit the use of a smaller drive motor.

A particular advantage of a compact spindle 14, such as that disclosed herein, is that a compact spindle is not adversely affected by torque or weighing moments associated with weighing pans possessing a large footprint. Large weighing pans have the potential to tilt and vibrate adversely affecting the time for the pan to settle and for weight measurement. The solution provided by the present invention provides a spindle 14 of compact dimensions which is able to hold multiple blister strips (receptacles) whilst not suffering the physical limitations of checkweighing systems employing a large surface area. A further advantage of a spindle 14 of compact dimensions is it affords the advantage of measuring multiple receptacles on a single balance.

In operation, the spindle 14 is weighed, the spindle 14 is then indexed by the drive motor 20 which results in alignment of the blister and the piercing element 32 located on the evacuation head holder 15. Once aligned, the piercing element 32 punctures the receptacle and a powder evacuation step, if initiated, draws the powder off to waste through the primary holes 17 within the piercing element 32. The spindle 14 is weighed again and the powder weight in the recently evacuated receptacle is determined.

Figure 8A:
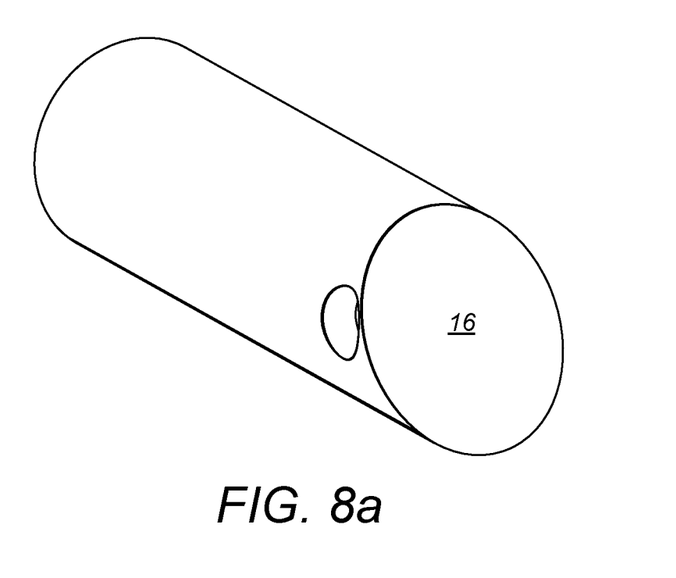
FIG. 8a and FIG. 8b show an exemplified piercing member.
Figure 8B:
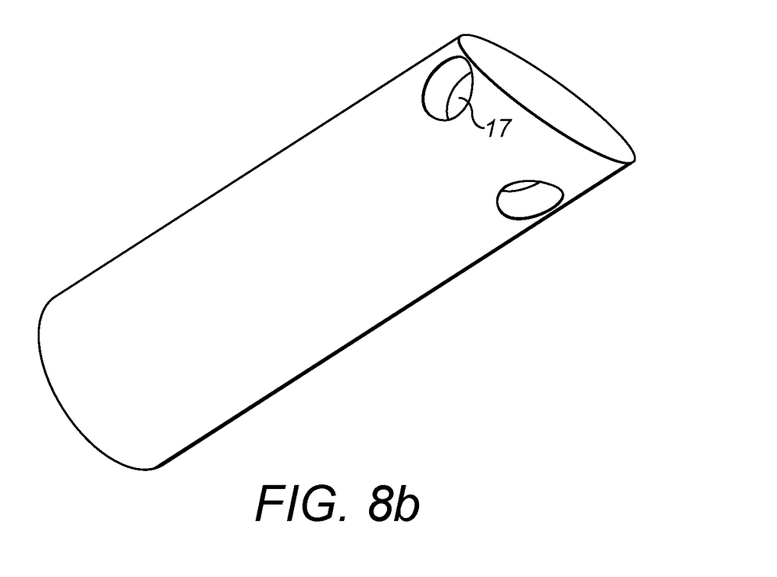

The evacuation head holder may comprise multiple piercing elements 32. The piercing element comprises a cutting surface for cutting the lid of the receptacle and a primary orifice 19 for extracting the contents contained within the receptacle, typically under vacuum. The piercing action involves puncturing the lid of the receptacle thereby creating a flap from the lid of the receptacle. In certain embodiments, upon evacuation, the flap in the lid of the receptacle is drawn back against the primary orifice 19 thereby occluding the primary orifice 19 and defeating the evacuation process. In such scenarios, a secondary orifice 17 is provided in the shaft of the piercing element 18 that does not become occluded by the flap created in the lid of the receptacle. This secondary channel 19 provides an alternate route for powder extraction. In an alternate embodiment, a piercing element 16 containing a cutting surface is disclosed that does not have a primary orifice. Instead this embodiment has a secondary orifice 17 located within the shaft of the piercing element 16. This secondary channel 16 provides an alternate route for powder extraction.

Additionally, the evacuation head holder 15 may contain a convex arcuate surface for engaging with the receptacles 12 or blister strips in place on the spindle 14. This arcuate surface complements the curved dimensions of the receptacles in place on the spindle thereby creating an improved seal permitting an improved evacuation of the contents from the receptacle.

The term 14 such that a spindle recess 24 thereof is moved from its current position to the position then occupied by the spindle recess 24 immediately clockwise thereof, in the case of a clockwise spindle rotation. Alternatively, in the case of counter-clockwise spindle rotation it will be the spindle recess immediately counter-clockwise thereof. Steps comprising other degrees of rotation may be possible in other embodiments of the present invention.

In FIGS. 1, 3 and 4, the balance 18 of the checkweigher 10 is shown to be located below the spindle 14 so as to weigh the spindle 14 at a single location. However, other embodiments are also possible. Particularly, it is possible to distribute multiple balance devices 18 of the checkweigher 10 of the present invention so that certain spindles 14 can be weighed at different spindle indexing positions. For example, and without limitation, in a checkweigher 10 having multiple spindles 14 designed to simultaneously retain associated powder receptacles, weighing devices may be distributed such that a evacuation assessments may be run concurrently. The weighing of spindles 14 in this manner may occur in any order and does not require that the spindles being weighed are adjacent. Such an arrangement may be advantageous when balance 18 space at any single spindle is limited.

In a preferred embodiment, the balances 18 are capable of quickly providing a reading. Consequently, the spindle 14 may index rapidly, for example, the spindle 14 of a typical checkweigher 10 of the present invention may index at a rate of between, 5-100 steps per minute, preferably 10-80 steps per minutes, more preferably between 20-60 steps per minute. Faster and slower indexing rates are also possible, however, and the particular rate selected may depend on the receptacle format being weighed, the diameter and/or weight of the spindle. In an alternate embodiment the spindle may be driven with a servo motor.

In a preferred embodiment, the spindle has a diameter of less than 300 mm, preferably less than 250 mm, preferably less than 200 mm, preferably less than 150 mm, preferably less than 120 mm, more preferably less than preferably less than 100 mm, more preferably less than 80 mm and more preferably less than 70 mm, less than 65 mm, less than 64 mm, less than 63 mm, less than 62 mm and less than 61 mm. In an alternate embodiment the spindle has a diameter of 65 mm, or 64 mm, or 63 mm, or 62 mm or 61 mm or 60 mm.

In a preferred embodiment, the spindle has a length of less than 900 mm, preferably less than 750 mm, preferably less than 600 mm, preferably less than 500 mm, preferably less than 120 mm, more preferably less than 109 mm, more preferably less than 108 mm, more preferably less than 107 mm preferably less than 100 mm, more preferably less than 80 mm and more preferably less than 60 mm and more preferably less than 30 mm.

Preferably, the balance 18 is tared at some interval. Taring of the balance 18 may be accomplished by a number of techniques known in the art.

In certain embodiments the checkweigher may comprise a the spindle with means for a dissipation of static charge. Suitable means include those known in the art for dissipating charge including metal strips, in particular a copper strip.

While certain embodiments of the present invention are described in detail above, the scope of the invention is not to be considered limited by such disclosure, and modifications are possible without departing from the spirit of the invention as evidenced by the following claims:

Drugs which may be used for said checkweigher include the following:

Bronchodilators (e.g. the β2-agonists bambuterol, bitolterol, broxaterol, carmoterol, clenbuterol, fenoterol, formoterol, indacaterol, levalbuterol, metaproterenol, orciprenaline, picumeterol, pirbuterol, procaterol, reproterol, rimiterol, salbutamol, salmeterol, terbutaline, vilanterol and the like);

Anti-muscarinics (e.g. ipratropium, ipratropium, bromide, oxitropium, tiotropium and glycopyrrolate);

Antibiotic and antibacterial agents (e.g. including the beta-lactams, fluoroquinolones, ketolides, macrolides, sulphonamides and tetracyclines, aclarubicin, amoxicillin, amphotericin, azithromycin, aztreonam chlorhexidine, clarithromycin, clindamycin, colistimethate, dactinomycin, dirithromycin, doripenem, erythromycin, fusafungine, gentamycin, metronidazole, mupirocin, natamycin, neomycin, nystatin, oleandomycin, pentamidine, pimaricin, probenecid, roxithromycin, sulphadiazine and triclosan);

Anti-infective agents (e.g. antivirals (including nucleoside and nonnucleoside reverse transcriptase inhibitors and protease inhibitors) including aciclovir, adefovir, amantadine, cidofovir, efavirenz, famiciclovir, foscarnet, ganciclovir, idoxuridine, indinavir, inosine pranobex, lamivudine, nelfinavir, nevirapine, oseltamivir, palivizumab, penciclovir, pleconaril, ribavirin, rimantadine, ritonavir, ruprintrivir, saquinavir, stavudine, valaciclovir, zalcitabine, zanamivir, zidovudine and interferons);

aminoglycosides (e.g. tobramycin; antifungals for example amphotericin, caspofungin, clotrimazole, econazole nitrate, fluconazole, itraconazole, ketoconazole, miconazole, nystatin, terbinafine and voriconazole; antituberculosis agents for example capreomycin, ciprofloxacin, ethambutol, meropenem, piperacillin, rifampicin and vancomycin; beta-lactams including cefazolin, cefmetazole, cefoperazone, cefoxitin, cephacetrile, cephalexin, cephaloglycin and cephaloridine; cephalosporins, including cephalosporin C and cephalothin; cephamycins such as cephamycin A, cephamycin B, cephamycin C, cephapirin and cephradine);

Leprostatics (e.g. clofazimine; penicillins including amoxicillin, ampicillin, amylpenicillin, azidocillin, benzylpenicillin, carbenicillin, carfecillin, carindacillin, clometocillin, cloxacillin, cyclacillin, dicloxacillin, diphenicillin, heptylpenicillin, hetacillin, metampicillin, methicillin, nafcillin, 2-pentenylpenicillin, penicillin N, penicillin O, penicillin S and penicillin V; quinolones including ciprofloxacin, clinafloxacin, difloxacin, grepafloxacin, norfloxacin, ofloxacine and temafloxacin); tetracyclines including doxycycline and oxytetracycline;

miscellaneous anti-infectives for example linezolide, trimethoprim and sulfamethoxazole.

Nonsteroidal anti-inflammatory agents (e.g. aceclofenac, acetaminophen, alminoprofen, amfenac, aminopropylon, amixetrine, aspirin, benoxaprofen, bromfenac, bufexamac, carprofen, celecoxib, choline, cinchophen, cinmetacin, clometacin, clopriac, diclofenac, diclofenac sodium, diflunisal, ethenzamide, etodolac, etoricoxib, fenoprofen, flurbiprofen, ibuprofen, indomethacin, indoprofen, ketoprofen, ketorolac, loxoprofen, mazipredone, meclofenamate, mefenamic acid, meloxicam, nabumetone, naproxen, nimesulide, parecoxib, phenylbutazone, piroxicam, pirprofen, rofecoxib, salicylate, sulindac, tiaprofenic acid, tolfenamate, tolmetin and valdecoxib);

Other anti-inflammatory agents (e.g. B-cell inhibitors, p38 MAP kinase inhibitors, particularly, ADS115398 and TNF inhibitors);

PDE4 inhibitors (e.g. cilomilast, etazolate, rolipram, oglemilast, roflumilast, ONO 6126, tolafentrine and zardaverine); quinazolinediones (e.g. nitraquazone and nitraquazone analogs; xanthine derivatives such as denbufylline and arofylline; tetrahydropyrimidones such as atizoram; and oxime carbamates such as filaminast);

Steroids (e.g. alcometasone, beclomethasone, beclomethasone dipropionate, betamethasone, budesonide, butixocort, ciclesonide, clobetasol, deflazacort, diflucortolone, esoxymethasone, dexamethasone, fludrocortisone, flunisolide, fluocinolone, fluometholone, fluticasone, fluticasone proprionate, hydrocortisone, methylprednisolone, mometasone, nandrolone decanoate, neomycin sulphate, prednisolone, rimexolone, rofleponide, triamcinolone and triamcinolone acetonide);

Matrix metalloprotease inhibitors (e.g. adamalysins, serralysins, and astacins);

Epithelial sodium channel (ENaC) inhibitors (e.g. P-680 and Denufosol;

CFTR Potentiators for example VX-809);

Methylxanthines (e.g. caffeine, theobromine and theophylline);

Drugs for cystic fibrosis management (e.g. *Pseudomonas aeruginosa* infection vaccines (eg Aerugen™), alpha 1-antitripsin, amikacin, cefadroxil, denufosol, duramycin, glutathione, mannitol, and tobramycin).

The invention claimed is:

1. A receptacle checkweigher comprising:
a frame which holds a support surface;
a moveable spindle having a plurality of recesses arranged to hold filled receptacles, the spindle connected to said support surface;
a weighing device;
a spindle drive motor operable to produce rotation of the spindle; and
an evacuation assembly operable to remove powder from the receptacles;
wherein the weighing device is configured to weigh the spindle and the plurality of receptacles together.

2. A receptacle checkweigher according to claim 1 wherein the spindle is arranged to hold a plurality of capsules.

3. A receptacle checkweigher according to claim 1 wherein the spindle is arranged to hold a plurality of blister strips.

4. A receptacle checkweigher as claimed in claim 3, in which the spindle is adapted to support a blister strip around a peripheral extent thereof.

5. A receptacle checkweigher as claimed in claim 4, in which the spindle comprises a plurality of recesses for receiving the blister strip, each blister of the blister strip nestably coupling with one of said recesses in use.

6. A receptacle checkweigher according to claim 1 wherein the spindle is arranged to hold a plurality of blister strips containing capsules.

7. A receptacle checkweigher according to claim 1 wherein the spindle is arranged to hold a plurality of blister cartridges.

8. A receptacle checkweigher according to claim 1 wherein the evacuation assembly comprises a piercing element.

9. A receptacle checkweigher according to claim 8 wherein the piercing element comprises a primary evacuation orifice.

10. A receptacle checkweigher according to claim 9 wherein the piercing element comprises a secondary evacuation orifice.

11. A receptacle checkweigher according to claim 1, wherein the spindle is arranged to dissipate static charge.

12. A receptacle checkweigher according to claim 11, wherein the spindle comprises a conducting strip.

13. A receptacle checkweigher according to claim 1 wherein the spindle comprises a blister strip wound around the spindle in a helix.

14. A receptacle checkweigher according to claim 1, wherein the checkweigher is arranged to measure the weight of a pre-metered dose of medicament in a blister, the checkweigher further comprising drive means operable to move the spindle to and from the weighing device, and a controller operable to control the drive means.

15. A receptacle checkweigher as claimed in claim 1, the evacuation assembly comprising a piercing station operable to piercably access the contents of each receptacle.

16. A receptacle checkweigher as claimed in claim 15, in which the piercing station comprises a piercing head having a piercing element and an evacuation orifice.

17. A receptacle checkweigher as claimed in claim 16, in which the piercing element is tubular and has a pointed peripheral edge at an open end thereof.

18. A receptacle checkweigher as claimed in claim 16, in which the piercing element and the evacuation orifice are provided coaxially with each other on the piercing head.

19. A receptacle checkweigher as claimed in claim 16, in which the piercing head comprises a further piercing element and a further said evacuation orifice.

20. A receptacle checkweigher as claimed in claim 16, in which the piercing element is cylindrical and is closed at one end by a planar piercing surface.

21. A receptacle checkweigher as claimed in claim 1, in which at least a portion of the evacuation means is moveable relative to the spindle.

22. A receptacle checkweigher comprising:
a frame which holds a support surface;
a moveable spindle having a plurality of recesses arranged to hold filled receptacles, the spindle connected to said support surface;
a weighing device operable to weigh the spindle and the plurality of receptacles;
a spindle drive motor operable to produce rotation of the spindle; and
an evacuation assembly operable to remove powder from the receptacle;
the receptacle checkweigher further comprising drive means operable to move the spindle to and from the weighing device, and a controller operable to control the drive means.

23. A receptacle checkweigher as claimed in claim 22, wherein the receptacle checkweigher is operable to measure the weight of a pre-metered dose of medicament in a blister.

* * * * *